Patented Aug. 26, 1924.

1,506,663

UNITED STATES PATENT OFFICE.

WALTER GEORGE PERKINS, OF LONDON, ENGLAND, ASSIGNOR, BY MESNE ASSIGNMENTS, TO METALS PRODUCTION COMPANY OF NORTH AMERICA, INCORPORATED, OF NEW YORK, N. Y.

TREATMENT OF OXIDIZED ORES.

No Drawing. Application filed September 20, 1921. Serial No. 502,069.

*To all whom it may concern:*

Be it known that I, WALTER GEORGE PERKINS, a subject of the King of England, residing at London, in England, have invented certain new and useful Improvements in the Treatment of Oxidized Ores, of which the following is a specification.

This invention consists in improvements in or relating to the treatment of oxidized ores. It will be understood that the expression "oxidized ores" includes ores which contain silicates, carbonates, sulphates, oxides, and similar oxidized metallic compounds; the term is in fact used in contradistinction to other generic terms, such as "sulphide ores."

The objects of the invention, broadly speaking are to facilitate the concentration of the ores, i. e. the separation of the values from the gangue, and (or) to obtain a product in a form suitable for smelting.

According to this invention, a process for the treatment of oxidized ores comprises converting the oxidized compound of the desired metal present in the ore into a magnetic compound by heating the ore in the presence of sulphur or sulphur and iron (for example a sulphide of iron, say iron pyrites), in a gaseous atmosphere which shall avoid undue oxidation of the sulphur or sulphur compound.

If the orignial ore contains no iron or other compound which can be rendered magnetic, iron pyrites is used as the sulphur-yielding addition, and the magnetic compound produced by the heat treatment is found to contain both sulphur and iron.

The original ore may itself contain iron, either combined with sulphur or not, in which case the heat treatment with sulphur or a sulphide will result in the production of sulphidized iron compounds, associated or combined with the required metal.

With certain ores it may be possible to produce a sulphidized compound or mixture which is magnetic without the presence or addition of iron, in which case sulphur or a non-ferrous sulphide may be used in the heat treatment.

When the treated and cooled ore is passed through a magnetic field of sufficient intensity, the metallic compound which has been rendered magnetic, together with any other magnetic product (such as any excess of pyrrhotite derived from the pyrites) are removed from the gangue or waste, and this recovered product may be particularly suitable for direct smelting or other subsequent treatment.

It may be desirable in certain cases first to give the ore a reducing roast and thereafter to effect the sulphidizing or magnetizing treatment in an atmosphere containing steam.

The invention may be applied to the treatment of oxidized ores of copper, nickel or lead, particularly of carbonate and other oxidized ores of copper.

Preferably the ore is heated in a reducing atmosphere prior to its admixture with the pyrites or the like for the production of the magnetic compound.

In carrying the invention into effect in the treatment of copper ores (for example copper carbonate ores), the oxidized copper present in the ore is converted into a magnetic compound by heating the suitably crushed dry ore with a sufficiency of pyrites, for a limited period, to a temperature of say between 400 and 600° C. and in a suitable gaseous atmosphere which shall avoid undue oxidation of the pyrites.

The magnetic compound of copper so produced is found to contain sulphur and some iron; the latter may be artificial pyrrhotite in close physical association with sulphide of copper, or possibly the iron as well as the sulphur may be in chemical combination with the copper. When, therefore, the treated and cooled ore is passed through a magnetic field of sufficient intensity the copper compound thus rendered magnetic, together with any other magnetic product (such as any excess of pyrrhotite derived from the pyrites) are removed from the gangue or waste, and this recovered copper sulphur and iron product is eminently suitable for smelting into copper by usual methods, with greater economy in sulphur or pyrites than if an otherwise concentrated oxidized copper mineral were treated with pyrites in a copper matting furnace.

The known means of flotation of carbonate and oxidized copper minerals from the accompanying gangue and waste, may be employed as a preliminary step in order, if desired, to obtain a more highly concentrated and oxidized copper product to convert into the magnetic compound which it is desired to obtain for smelting.

Since the production of the magnetic copper compound may be prejudicially affected by unduly rapid oxidation or other removal of sulphur, the gaseous atmosphere in which the operation is carried out should contain a minimum of oxygen. Steam may be used, and this will convert some of the sulphur of the pyrites into sulphur dioxide and into sulphuretted hydrogen which will pass from the furnace and yield elemental sulphur on cooling the gases, in accordance with the reactions explained in my previous British patent specification No. 23847 of 1920.

Alternately an atmosphere of a reducing gas such as hydrogen, producer- or semi-water gas, or hydrocarbon gas, may be employed. Such reducing gas may be used for the atmosphere in which the mixture of oxydized copper ore or product and pyrites is heated, or it may be employed to reduce oxidized copper ore alone as a preliminary step before the ore is admixed with pyrites. In the latter case the temperature of the reducing step should be between say 300 and 400° C. The result is found to be very advantageous as the heating of the reduced copper mineral with pyrites may take place in a closed gas atmosphere or circuit, no sulphur being driven off from the total charge.

To effect this operation a multiple-hearth furnace may be employed, in the upper hearths of which the reduction of the oxidized copper by the selected reducing gas may be effected, a current of reducing gas being used for the purpose; the reduced ore may now be charged or passed into a lower hearth or hearths, there admixed with a suitable proportion of pyrites, and heated in a closed circuit or atmosphere of neutral or reducing gas in order to form the magnetic copper compound.

The following is an example of the application of the invention to the treatment of a copper carbonate ore. This ore contained 11.6% of copper of which 7.6% was present as oxide, 4% as sulphide. A sample of this ore was ground to pass through a sieve of ¼" mesh and subjected to preliminary reduction by heating for about one hour to a temperature of from 300 to 400° C. in an atmosphere of coal gas. The ore thus treated was ground to —80 mesh (I.M.M.) and mixed with pyrites (150 mesh) in the proportion of 4:1. The mixture was then roasted in an atmosphere of steam at a temperature of 490° C., the duration of this step in the process being approximately 25 minutes. On cooling, the treated ore was passed to a magnetic separator giving three products. Of these, the first two (the concentrates) assayed 15.6% copper, which is equivalent to 89.5% recovery of copper from the original ore, in the form of a product particularly suitable for final reduction by smelting. The concentrates also contained 20.2% iron, or 88.2% recovery from the original pyrites. In addition 33.4% of insoluble matter, was contained in the concentrates, which is equivalent to 35.8% recovery from the original ore, or in other words to 64.2% elimination of the gangue from the ore. The tailings contained 1.9% copper (or 10.5% on the original ore), 62.3% insoluble material (or 64.2% on the original ore), and 2.8% of iron (or 11.8% on the original ore). Most of the copper in the tailings was present as original sulphide.

Some oxidized copper ores may contain pyrites or other sulphide in sufficient proportions to reduce materially the amount of added pyrites or even in certain cases to render such admixture unnecessary.

In the production of nickel, difficulties have frequently occurred, particularly in recent years, owing to the low grade of the nickel ores available and to the difficulty of concentrating them or rendering them suitable for smelting.

According to this invention an ore containing oxidized nickel compounds, when heated in a suitable atmosphere in admixture with iron pyrites, can yield a magnetic compound containing the nickel, and this compound may be separated by magnetic means from the rest of the ore.

A similar process may be applied to the treatment of oxidized lead ores.

It will be understood that any other heating apparatus than that above described may be used which allows for suitable control of the temperature and control of the atmosphere.

What I claim as my invention and desire to secure by Letters Patent is:—

1. A process for the treatment of oxidized ores which comprises imparting magnetic properties to the oxidized ore-particles containing the desired metal by heating them in the presence of a compound of sulphur and a magnetizable metal in an atmosphere which will not react vigorously with the materials to remove sulphur rapidly substantially as set forth.

2. A process for the treatment of oxidized ores which comprises imparting magnetic properties to the oxidized ore-particles containing the desired metal by heating them in the presence of sulphur and iron in an atmosphere which will not react vigorously with the materials to remove sulphur rapidly substantially as set forth.

3. A process for the treatment of oxidized ores which comprises imparting magnetic properties to the oxidized ore-particles containing the desired metal by heating them in the presence of a sulphurized iron compound in an atmosphere which will not react vigorously with the materials to remove sulphur rapidly substantially as set forth.

4. A process for the treatment of oxidized ores which comprises imparting magnetic properties to the oxidized ore-particles containing the desired metal by heating them in the presence of iron pyrites in an atmosphere which will not react vigorously with the materials to remove sulphur rapidly substantially as set forth.

5. A process for the treatment of oxidized copper ores which comprises imparting magnetic properties to the oxidized ore-particles containing the copper by heating them in the presence of a sulphur and iron compound in an atmosphere which will not react vigorously with the materials to remove sulphur rapidly substantially as set forth.

6. A process for the treatment of oxidized copper ores which comprises imparting magnetic properties to the oxidized ore-particles containing the copper by heating them in the presence of iron pyrites in an atmosphere which will not react vigorously with the materials to remove sulphur rapidly substantially as set forth.

7. A process for the treatment of oxidized ores which comprises preliminarily heating the ore in a reducing atmosphere and subsequently imparting magnetic properties to the oxidized ore-particles containing the desired metal by heating them in the presence of a sulphur and iron compound in an atmosphere which will not react vigorously with the materials to remove sulphur rapidly substantially as set forth.

8. A process for the treatment of oxidized copper ores which comprises preliminarily heating the ore in a reducing atmosphere and subsequently imparting magnetic properties to the oxidized ore-particles containing the copper by heating them in the presence of iron pyrites in an atmosphere which will not react vigorously with the materials to remove sulphur rapidly substantially as set forth.

9. A process for the treatment of oxidized ores which comprises imparting magnetic properties to the oxidized ore-particles containing the desired metal by heating them in the presence of a sulphur and iron compound in an atmosphere in which steam predominates.

10. A process for the treatment of oxidized copper ore which comprises imparting magnetic properties to the oxidized ore-particles containing the copper by heating them in the presence of iron pyrites in an atmosphere in which steam predominates.

11. A process for the treatment of oxidized ores which comprises preliminarily heating the ore in a reducing atmosphere and subsequently imparting magnetic properties to the oxidized ore-particles containing the desired metal by heating them in the presence of sulphur and iron in an atmosphere in which steam predominates.

12. A process for the treatment of oxidized copper ore which comprises preliminarily heating the ore in a reducing atmosphere and subsequently imparting magnetic properties to the oxidized ore-particles containing the copper by heating them in the presence of iron pyrites in an atmosphere in which steam predominates.

13. A process for the treatment of oxidized copper ore which comprises preliminarily heating the ore in a reducing atmosphere, subsequently imparting magnetic properties to the oxidized ore-particles containing the copper by heating them in the presence of iron pyrites in an atmosphere in which steam predominates, and separating the magnetic compound from the treated ore.

In testimony whereof I affix my signature.

WALTER GEORGE PERKINS.